(12) United States Patent
Schmugar et al.

(10) Patent No.: US 11,176,249 B2
(45) Date of Patent: Nov. 16, 2021

(54) CACHED FILE REPUTATIONS

(71) Applicant: McAfee, LLC, San Jose, CA (US)

(72) Inventors: Craig Schmugar, Beaverton, OR (US); Jyothi Mehandale, Bangalore (IN)

(73) Assignee: McAfee, LLC, San Jose, CA (US)

( * ) Notice: Subject to any disclaimer, the term of this patent is extended or adjusted under 35 U.S.C. 154(b) by 291 days.

(21) Appl. No.: 16/368,039

(22) Filed: Mar. 28, 2019

(65) Prior Publication Data
US 2020/0311259 A1 Oct. 1, 2020

(51) Int. Cl.
| H04L 29/06 | (2006.01) |
|---|---|
| G06F 21/55 | (2013.01) |
| G06F 21/56 | (2013.01) |
| G06F 16/2455 | (2019.01) |

(52) U.S. Cl.
CPC ...... G06F 21/552 (2013.01); G06F 16/24552 (2019.01); G06F 21/567 (2013.01); *G06F 2221/033* (2013.01)

(58) Field of Classification Search
CPC .... G06F 21/552; G06F 21/554; G06F 21/567; G06F 16/24552; G06F 16/24553; G06F 2221/033; H04L 63/1416; H04L 63/145
See application file for complete search history.

(56) References Cited

U.S. PATENT DOCUMENTS

| 8,621,610 | B2* | 12/2013 | Oberheide | H04L 63/145 |
| | | | | 726/22 |
| 8,725,849 | B1 | 5/2014 | Lloyd | |
| 9,178,906 | B1* | 11/2015 | Chen | H04L 63/1441 |
| 9,557,841 | B2* | 1/2017 | Bermel | G06F 3/045 |
| 9,967,264 | B2* | 5/2018 | Harris | H04L 63/102 |
| 10,382,459 | B2* | 8/2019 | Harris | H04L 63/107 |
| 10,841,339 | B2* | 11/2020 | Ray | H04L 63/1416 |
| 10,878,110 | B2* | 12/2020 | Kraft | G06F 21/606 |
| 2009/0328209 | A1 | 12/2009 | Nachenberg | |
| 2013/0262851 | A1 | 10/2013 | Hirvonen | |
| 2016/0085970 | A1 | 3/2016 | Rebelo | |
| 2019/0005267 | A1 | 1/2019 | Soman et al. | |

* cited by examiner

*Primary Examiner* — Hosuk Song
(74) *Attorney, Agent, or Firm* — Patent Capital Group

(57) ABSTRACT

There is disclosed in one example a computing apparatus, including: a network interface; a hardware platform, including at least a processor and a memory; and instructions encoded in the memory to instruct the processor to: identify an executable object to be run on the apparatus, the executable object to provision a plurality of local files or objects with unknown local reputations; query via the network interface a remote service with an identification of the executable object; responsive to the query, receive from the remote service a reputation batch for the local files or object; and selectively permit installation of the executable object and/or the plurality of local files or objects based at least in part on individual reputations within the reputation batch.

19 Claims, 8 Drawing Sheets

CACHED FILE REPUTATIONS

FIELD OF THE SPECIFICATION

This disclosure relates in general to the field of anti-malware technology, and more particularly, though not exclusively, to a system and method for providing cached file reputations.

BACKGROUND

Modern computers often have always-on Internet connections. Such connections can provide multiple vectors for security threats to attack a system.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

SUMMARY

Figure 1:
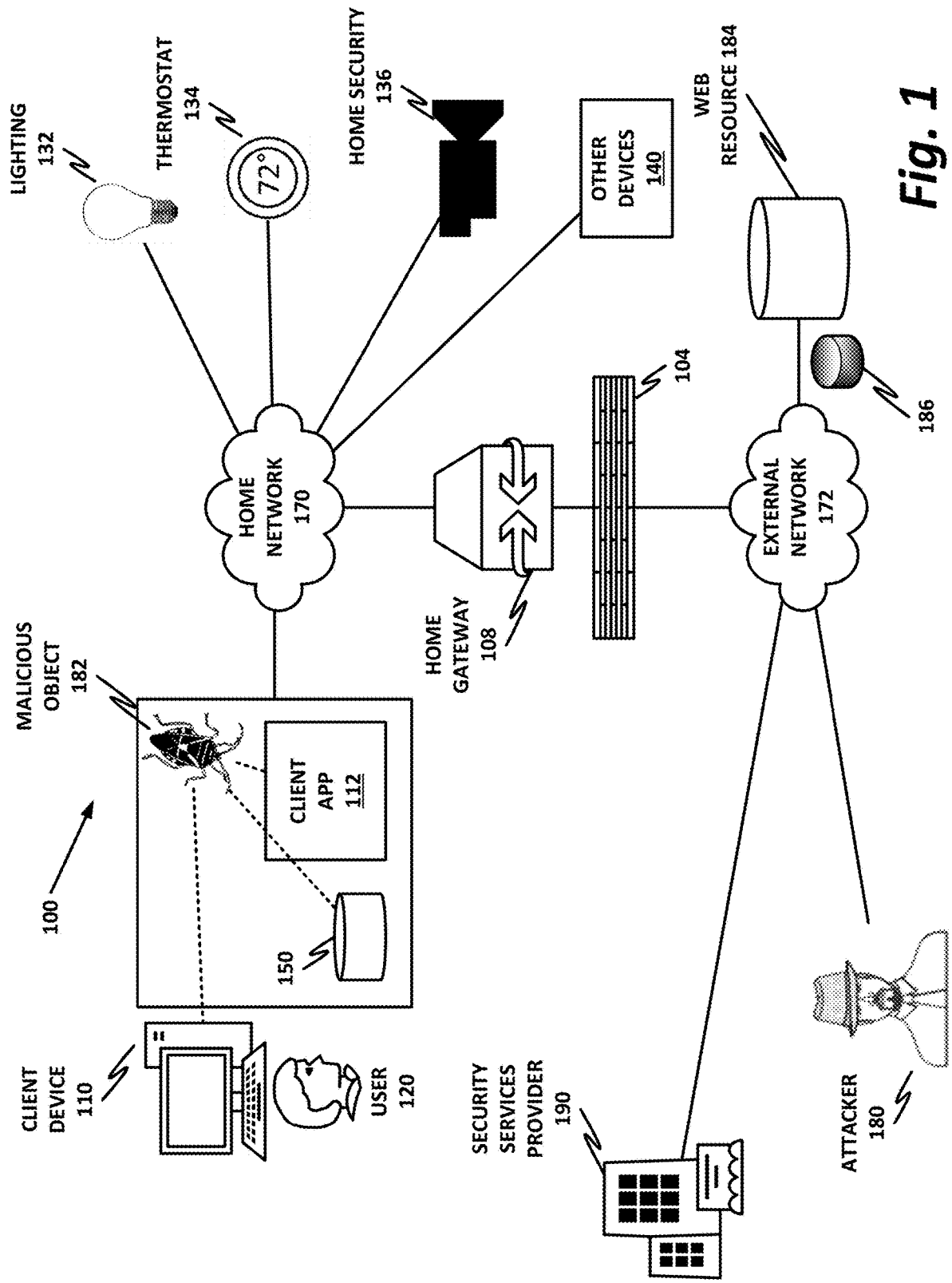
FIG. 1 is a block diagram of a home network.

In an example, there is disclosed a computing apparatus, comprising: a network interface; a hardware platform, comprising at least a processor and a memory; and instructions encoded in the memory to instruct the processor to: identify an executable object to be run on the apparatus, the executable object to provision a plurality of local files or objects with unknown local reputations; query via the network interface a remote service with an identification of the executable object; responsive to the query, receive from the remote service a reputation batch for the local files or object; and selectively permit installation of the executable object and/or the plurality of local files or objects based at least in part on individual reputations within the reputation batch.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

A primary vector for compromising computer and network security is downloaded files. Generally speaking, it is much easier to compromise a machine or network by convincing an end user to download and install a file and to grant the file privileges on the machine than it is to identify and exploit weaknesses in operating system security. A very common malware attack is to create a downloadable file that masquerades as a useful or desirable function or utility, and that may even provide the purported function, but that also performs malicious or undesirable action in the background.

A computer security vendor such as MCAFEE, LLC may maintain a global database of known objects with associated reputations. The database may go further than simply assigning objects as being either malware or benignware. Rather, the global database can indicate whether objects perform their intended function, whether they contain adware or spyware, whether they contain known viruses, or whether they perform other desirable or undesirable actions. Note that a security services provider could also maintain a dedicated enterprise threat database, which could serve as the equivalent of a global threat database for a global database. This involves some level of tradeoff. The individual enterprise can fully "own" the data in the enterprise threat database, but at the cost of having fewer data than would be found in a truly global database (which may include data points from many different enterprises).

While such a global database is useful and beneficial, modern computing practices sometimes render existing naïve solutions insufficient. For example, in the early days of downloadable installers, an installer may have installed only one or a few files to the operating system. This may have included a main executable, a small handful of dynamic libraries, and perhaps a small number of configuration files. But in modern practice, a downloadable installer might install hundreds or even thousands of files to the user's system. The installer, itself, may be trusted. For example, the global or enterprise threat intelligence database may have a hash of the installer file, and the installer may have been analyzed in detail by way of methods such as deep static analysis, installation in a sandbox environment, or other security research methods, all to ensure that the installer is benign as far as can be ascertained. If the user downloads the executable file, and the executable file hashes to a value that matches the hash for the known trusted installer in the global database, then there is very high likelihood that the downloaded file is benign and can be trusted. However, that trust cannot always be ensured once the executable begins installing files to the user system. For example, many modern executables will download a large number of files from a web server as part of the installation. While this makes the download itself more efficient—the user initially downloads only a lightweight installer, and the installer then fetches from a web resource only those files needed for the user's particular installation—the result is not necessarily trustworthy. Furthermore, if the user's device is already compromised, then a malicious process could piggyback on the installer and its trusted status, and could use that trusted status to install malicious files to a usable location. For example, malware may install initially only in an untrusted location. Nevertheless, if it is able to inject code into a trusted installer that receives elevated privileges, then the malicious thread, which was previously limited in its system privileges, can now operate at an elevated system level.

It is beneficial, then, to check the trust status not only of the initial installer, but also of all the files that the installer attempts to write to the system. While this is a desirable security function, it can be frustrating to the end user, and experientially, when security functions interfere too much with a user's use and enjoyment of the computing system, the security features tend to be disabled. Most computing models recognize various tiers of data access. The fastest data access occurs with values stored in on-chip registers, which can be accessed generally on-demand in a single clock cycle. Next, various levels of cache may be provided, which can be predictably loaded with values that will be needed in the program. The levels of cache may be one or more orders of magnitude slower than register access, and the upper levels of cache may be one or more orders of magnitude slower than the last level cache. Main memory is at the next tier, and is generally considered much slower than cache access, so much so that a processor that fails to cache it at a rate of approximately 99% or higher cannot be considered a high-end or efficient processor in modern usage. A local static memory, such as a hard disk, is yet again orders of magnitude slower than main memory. Finally, the slowest memory operations are those that are required to access remotely stored data, such as by querying an Internet address and waiting for a response with the data in a payload.

Thus, while the user is waiting for the computer to install the desired program, the security agent on the computer may wish to verify that each file in the installer is benign. Even with a well-loaded cache, if the installer is required to wait while the security agent synchronously queries the remotely-located global threat database, installation can slow to a crawl, causing frustration for the user. One workaround for this is to allow the program to install, and then to asynchronously query the global threat database for a reputation for each file that was installed. However, if a malicious file is not detected until after it has been installed, it may have already been permitted to do useful work, and in some cases damage is irrevocably done. For example, if a malicious file is installed that collects and transmits sensitive user data, then it may not matter that the file is detected later. Once the data have been transmitted, they are in the hands of the bad actor.

Recognizing these limitations in presently-available systems, the present specification provides a security agent that evaluates downloaded applications and installers to check for malicious content. Rather than making a large number of synchronous, expensive cloud calls, or waiting until the files are already installed to make an asynchronous query, the present specification provides a high-security solution that provides a high-confidence security analysis of individual downloaded or installed files, while also preserving user experience and device performance.

Embodiments of the security agent include the ability to monitor the user's network access, and to predict if and when a user is likely to download an installer. If the user is likely to download an installer, then the system can query a global threat database before or during the initial download. For example, if the user is visiting the website of a popular game, the security agent may predict that the user will download the installer for the game. Furthermore, based on metadata (such as strings in the user agent), the installer may predict which version of the download will be accessed. For example, separate installers may be provided for Windows, Mac OS X, and various flavors of Linux (.deb, .rpm, .tar.gz).

Separate installers may also be provided based on processor word size (e.g., 32 or 64-bits). In some cases, the agent may make a query and/or prediction only if the user is visiting a site that has a discernible "download" type link. In the absence of a downloadable link, the website may be passed over by the security agent as unlikely to be the source of a download.

Cloud analytics may be used to predict which files and objects are going to need a reputation for an anticipated or started install. These reputations can be locally cached before the user interacts with those objects. This can be accomplished, for example, through download associations. For example, a global database can be used to determine what other similar users and systems did when visiting the same universal resource locator (URL). If users visiting that URL generally download a particular file, and that file generally downloads and/or installs another list of files, then it can be predicted that the present user may do something similar. Reputations for those files and objects can then be locally cached, where they can be accessed on-demand during the anticipated install interaction.

One aspect of the teachings of the present specification is a prediction of which files the user will encounter based on contextual information. The contextual information may include factors such as, for example, the user's own history, heuristics, the websites the user is visiting or has visited, the download location, the date and time, the operating system, the browser, the referring URL, or any other data that may be predictive of the user's action. Such interactions can be cached in a global database, and the more such interactions occur, the higher the confidence that other users will perform similar actions. Because privacy is a significant concern, and in some cases may be a legal issue, these user interactions can be stored anonymously in a global threat database to preserve user privacy.

This predictive system is superior to systems that simply trust blindly particular downloadable files or executables as delivering trustworthy files or content. As discussed above, such systems can be vulnerable to the injection of malicious processes, or depending on context, may simply result in the installation of files that were not installed in previous instances. The solution presented here is also superior to systems that use non-blocking cloud calls, one at a time. Either of these solutions can create security gaps. Furthermore, waiting to perform cloud calls until the time of installation could result in cloud unavailability if, for example, the system is no longer connected to the network when the installation actually occurs.

Advantageously, the data that are delivered can be relatively lightweight. The data may include items such as hashes of individual files, names of files, reputations for files, and other data that may be useful in making security decisions. Because these data are relatively lightweight, on a modern computing system, the cost in terms of computing bandwidth and compute resources of downloading these files is relatively low-even if, ultimately, the prediction is incorrect and the files are never needed. Furthermore, because the cache reputation data are relatively lightweight, they can be stored for a sufficient time without consuming large amounts of the user's storage resources. In some cases, the reputation data may be time stamped, and may be deleted on events such as a user disk cleanup, or when the data become stale and are considered no longer relevant to the computing operations.

A system and method for providing cached file reputations will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a block diagram of a home network 100. Embodiments of home network 100 may be configured or adapted to provide the method of providing cached file reputations as disclosed in the present specification.

In the example of FIG. 1, home network 100 may be a "smart home" with various Internet of things (IoT) devices that provide home automation or other services. Home network 100 is provided herein as an illustrative and nonlimiting example of a system that may employ and benefit from the teachings of the present specification. But it should be noted that the teachings may also be applicable to many other entities including, by way of nonlimiting example, an enterprise, data center, telecommunications provider, government entity, or other organization.

Within home network 100, one or more users 120 operate one or more client devices 110. A single user 120 and single client device 110 are illustrated here for simplicity, but a home or enterprise may have multiple users, each of which may have multiple devices.

Client devices 110 may be communicatively coupled to one another and to other network resources via home network 170. Home network 170 may be any suitable network or combination of one or more networks operating on one or more suitable networking protocols, including a local area network, an intranet, a virtual network, a wide area network, a wireless network, a cellular network, or the Internet (optionally accessed via a proxy, virtual machine, or other similar security mechanism) by way of nonlimiting example. Home network 170 may also include one or more servers, firewalls, routers, switches, security appliances, antivirus servers, or other network devices, which may be single-purpose appliances, virtual machines, containers, or functions running on client devices 110.

In this illustration, home network 170 is shown as a single network for simplicity, but in some embodiments, home network 170 may include any number of networks, such as one or more intranets connected to the Internet. Home network 170 may also provide access to an external network, such as the Internet, via external network 172. External network 172 may similarly be any suitable type of network.

Home network 170 may connect to the Internet via a home gateway 108, which may be responsible, among other things, for providing a logical boundary between home network 172 and external network 170. Home network 170 may also provide services such as dynamic host configuration protocol (DHCP), gateway services, router services, and switching services, and may act as a security portal across home boundary 104.

Home network 100 may also include a number of discrete IoT devices, which in contemporary practice are increasing regularly. For example, home network 100 may include IoT functionality to control lighting 132, thermostats or other environmental controls 134, a home security system 136, and any number of other devices 140. Other devices 140 may include, as illustrative and nonlimiting examples, network attached storage (NAS), computers, printers, smart televisions, smart refrigerators, smart vacuum cleaners and other appliances, and network connected vehicles.

Home network 100 may communicate across home boundary 104 with external network 172. Home boundary 104 may represent a physical, logical, or other boundary. External network 172 may include, for example, websites, servers, network protocols, and other network-based services. In one example, an attacker 180 (or other similar malicious or negligent actor) also connects to external network 172. A security services provider 190 may provide services to home network 100, such as security software, security updates, network appliances, or similar. For example, MCAFEE, LLC provides a comprehensive suite of security services that may be used to protect home network 100.

In one example, user 120 may use client device 110 to access a web resource 184 via external network 172. For example, web resource 184 may host a utility, game, or other downloadable content that user 120 may wish to install on client device 110. In accessing web resource 184, the user may download content 186, which may include, for example, an executable or other binary file that is an installer. Such an installer could be executable on any of various platforms, a Windows medium-scale integration (MSI) file that uses "msiexec.exe" as an install script, a Linux or Unix package, a bundled file such as a "zip" or ".tgz" file, or other similar content.

When user 120 operates client device 110 to install content 186, content 186 may install a plurality of files, and in some cases this may be of a large number of files such as hundreds or thousands of files. Although content 186 may itself have been verified as "safe" content by security services provider 190, this does not necessarily guarantee that all of the hundreds of files installed by content 186 are themselves safe. For example, as part of the install process, content 186 may download and install other files, or may create files. If attacker 180 has managed to compromise the process, then content 186 could install a malicious file that attacker 180 could use to harm user 120 or client device 110. For example, in a case where content 186 is an MSI installer file, if attacker 180 is able to compromise the msiexec.exe script, then attacker 180 may be able to cause content 186 to install malicious files onto client device 110. The malicious files may be installed with elevated privileges, which may result in substantial harm to client device 110. This could compromise home network 170, home gateway 108, and any of the various IoT devices illustrated herein. Furthermore, if client device 110 accesses enterprise resources, then attacker 180 may gain unauthorized access to enterprise resources.

FIGS. 2-5 below illustrate embodiments of a security agent that may be installed as a client application 112 on client device 110, to defeat malicious object 182, that may be installed by attacker 180.

It may be a goal of users 120 and home network 100 to successfully operate client devices 110 and IoT devices without interference from attacker 180 or from unwanted security objects. In one example, attacker 180 is a malware author whose goal or purpose is to cause malicious harm or mischief, for example, by injecting malicious object 182 into client device 110. According to embodiments of the present specification, malicious object 182 may include a fileless attack or a living off the land attack. Fileless attacks or living off the land attacks may be considered security threats or attacks, by way of nonlimiting example. Once malicious object 182 gains access to client device 110, it may try to perform work such as social engineering of user 120, a hardware-based attack on client device 110, modifying storage 150 (or volatile memory), modifying client application 112 (which may be running in memory), or gaining access to home resources. Furthermore, attacks may also be directed at IoT objects. IoT objects can introduce new security challenges, as they may be highly heterogeneous, and in some cases may be designed with minimal or no security considerations. To the extent that these devices have security, it may be added on as an afterthought. Thus, IoT devices may in some cases represent new attack vectors for attacker 180 to leverage against home network 170.

Malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110 or any of the IoT devices described. As used throughout this specification, malicious software ("malware") includes any security object configured to provide unwanted results or do unwanted work. In many cases, malware objects will be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including, by way of nonlimiting example, data destruction, covert data collection, browser hijacking, network proxy or redirection, covert tracking, data logging, keylogging, excessive or deliberate barriers to removal, contact harvesting, and unauthorized self-propagation.

In enterprise cases, attacker 180 may also want to commit industrial or other espionage, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to an application repository or programming an IoT device may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Home network 100 may contract with or subscribe to a security services provider 190, which may provide security services, updates, antivirus definitions, patches, products, and services. MCAFEE, LLC is a nonlimiting example of such a security services provider that offers comprehensive security and antivirus solutions. In some cases, security services provider 190 may include a threat intelligence capability such as the GTI database provided by MCAFEE, LLC. Security services provider 190 may update its threat intelligence database by analyzing new candidate malicious objects as they appear on client networks and characterizing them as malicious or benign.

Other considerations may include parents' desire to protect their children from undesirable content, such as pornography, adware, spyware, age-inappropriate content, advocacy for certain political, religious, or social movements, or forums for discussing illegal or dangerous activities, by way of nonlimiting example.

Figure 2:
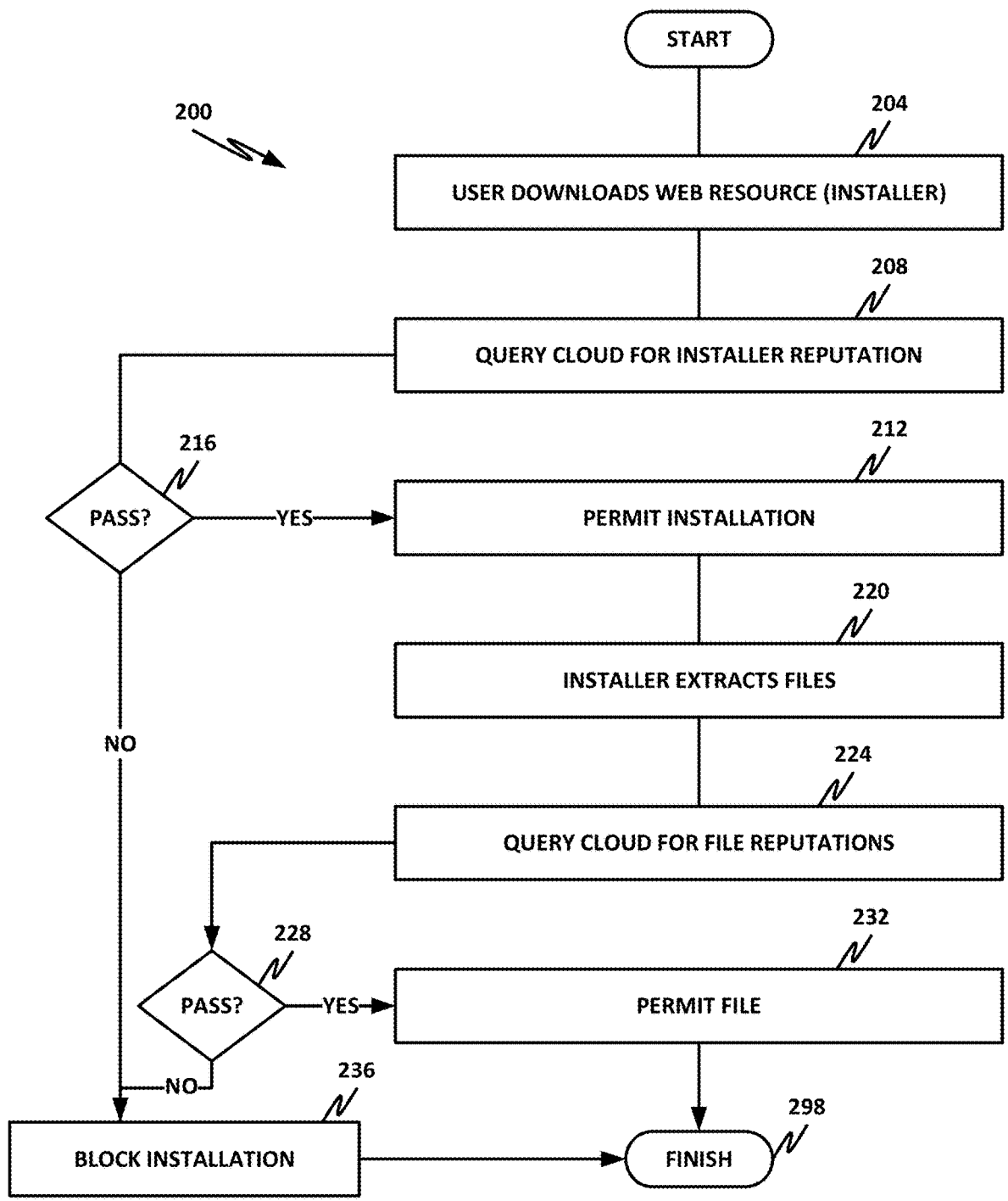
FIG. 2 is a flowchart of a method that may be performed by a security agent on a client device.

FIG. 2 is a flowchart of a method 200 that may be performed by a security agent on a device such as client device 110 of FIG. 1.

Starting in block 204, a user such as user 120 of FIG. 1 may download a web resource, such as an installer as discussed above.

In block 208, a security agent running on the client device may query a cloud resource, such as the global threat intelligence database provided by MCAFEE, LLC or a similar cloud resource, for a global resource for the requested installer. This can be based on any of a variety of factors, including a hash, deep static analysis, sandbox analysis, or any of the other various antivirus or anti-malware methods that may be performed. In various cases, the global reputation for the installer object may have been computed previously, or may be computed on the fly by the cloud resource. In decision block 216, the security agent receives a response and determines whether the installer object has passed the security screening. If the installer object does not pass, then in block 236, the installation is blocked, and in block 298 the method is finished.

Returning to block 216, if the installer object does pass security analysis, then in block 212, the security agent permits the installation as requested. Thus, the installer object is allowed to launch and begin installing files to the user's machine.

In block 220, the installer object begins extracting, creating, and/or downloading files from the Internet. As described above, increased security may require that each of these files be individually assigned a reputation to ensure that the files themselves are not, or do not contain, malware.

In block 224, the security agent begins to query the cloud for file reputations for each file that is attempted to be installed or downloaded. In decision block 228, the security agent determines whether each file passes the security screening. If a file fails the security screening, then in block 236, installation of that file may be blocked. Depending on security setting, the identity of the file, and other factors, this may result in a complete blockage of the entire installer object, or it may result simply in the rejection of the individual file. Furthermore, in some embodiments, the cloud resource or other security monitor may be notified of the failed attempt to install a compromised file, and appropriate remedial action may be taken as necessary.

Returning to block 228, if the files pass security screening, then in block 232, those files are permitted to be installed as requested. If installation proceeds normally and completes without errors, then in block 298, the method is done.

While this method results in enhanced security because a reputation is computed for each individual file, it is possible that this method also results in substantial delay in the user's use of the installed program and operation on the files. As discussed above, accessing remote data is an operation that can be many orders of magnitude higher in delay than accessing local data. Furthermore, although the payload of each transaction may be relatively small—it may consist essentially of a hash or other identification for the file, and a reputation for a file matching that hash—the transaction overhead can be substantial. In fact, with a large number of transactions with very small payloads, the ratio of overhead to payload can be very high, which is undesirable. It is therefore desirable to modify the security agent so that the security of method 200 can be realized without requiring a large number of high-overhead and small-payload transactions.

Figure 3:
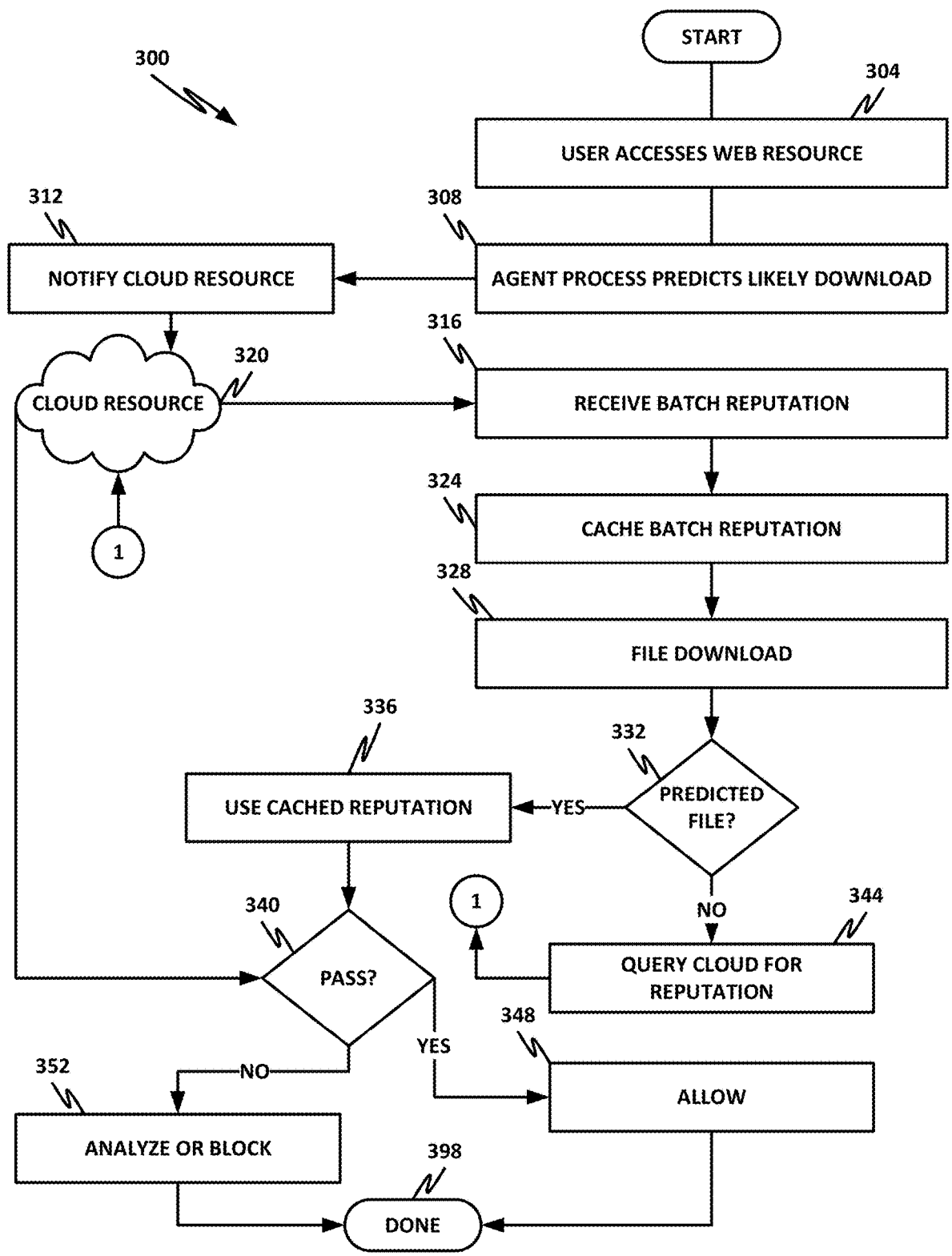
FIG. 3 is a flowchart of a method that is performed on a client-side security agent.

FIG. 3 is a flowchart of a method 300 that is performed on a client-side security agent.

Starting in block 304, a user such as user 110 of FIG. 1 or other user accesses a web or other Internet resource.

In block 308, the security agent process predicts a likely download based on that user's interaction with the webpage. For example, the webpage itself may have a global reputation that is not only a security reputation, but also includes an indication of the most likely files to be downloaded from that particular website. To provide just one illustrative example, if the website is the homepage for a popular game, then the global reputation may include a reputation that most users who visit the website download the installer executable for the popular game. Thus, before the user has opted to download the installer for the game, the security agent may predict that the user is likely to download the game installer. This can be accomplished, for example, in block 312, where the security agent notifies the cloud resource of which webpage or webpages the user is visiting, and cloud resource 320 returns a probability that the user is going to install a particular file. Note that this need not include tracking all of the user's web activity, but rather, queries may be made without necessarily caching them. Furthermore, any queries can be made anonymously to ensure that the user's privacy is not compromised. Cloud resource 320 may generate a batch reputation for the likely installer and its anticipated files, and in block 316, the security agent may receive the batch reputation.

In block 324, the local security agent can cache the batch reputation in a local security repository. This can be a database or temporary file on the user's operating system.

In block 328, the user begins to actually download the file. Note that in some cases, the operation of predicting the download and receiving a batch reputation may not begin until after the user actually initiates the file download. This can both enhance the user's security, and also avoid unnecessary network queries which may otherwise need to be made every time the user visits a new website. For example, when the user clicks "download" and begins to save the file, the security agent may then request the batch reputation, and the batch reputation can be returned in parallel with the download of the file. Advantageously, the batch reputation will generally be much smaller than the downloadable file itself, and thus will usually complete downloading well before the file itself is downloaded.

In the case where a prediction has been made that the user will download a particular file, then in decision block 332, the security agent determines whether the downloaded file is the predicted file. Decision block 332 also comes into play as individual files are extracted and installed. The batch download received in block 316 includes a batch of files anticipated to be installed by the installer, but may not necessarily match the files that are actually installed. Thus, decision block 332 may also include a check as to whether an individual file is predicted to have been installed by the downloaded installer.

Whether for the entire executable or for individual installed files, if the file is the predicted file, then in block 336, the security agent checks the file against its cached reputation to determine whether the file is safe to install.

In decision block 340, if the file passes the security check, then in block 348, the file is allowed. This may be repeated for each file to be installed. If all files are installed successfully, then in block 398, the method is done.

Returning to block 332, if the security agent encounters a file that was not a predicted file, then there is no cached reputation to use. In that case, in block 334, the security agent queries the cloud resource 320 for a reputation for the file. This reputation is returned and in decision block 340, as before, a decision is made whether the file is safe. As before, if the file is allowed, then installation continues and in block 398, the method is done.

Returning to block 340, if it is determined that the installer or individual files are not safe or that they have an insufficiently high reputation, then in block 352, the system may further analyze and/or block installation. Outright blocking may occur if the file is determined to have a negative or unsafe reputation, and is known to be unsafe for the user's system. In some cases, the file may be unknown, or this may be the first time the file has been encountered. In that case, there is no local reputation, and cloud resource 320 may also have no global reputation for the file. In that case, the file may be subjected to additional analysis. This analysis could be performed locally on the machine, such as by an antivirus scanner that can perform deep static analysis or other analysis of the file to determine whether it is potentially malicious. In other examples, more detailed analysis may be performed by cloud resource 320, which may perform deep static analysis, sandbox analysis, analysis by a neural network or other deep learning machine, or other analysis to determine whether the unknown file is believed to be malicious. In some cases, installation of the file may be blocked until the analysis may be completed, or at least until a user may be informed that the file has no known reputation, that it cannot be certified to be safe, and that the user needs to decide whether to install the file, anyway. After the analysis, and a decision is made of what to do with the installation, in block 398, the method is done.

Figure 4:
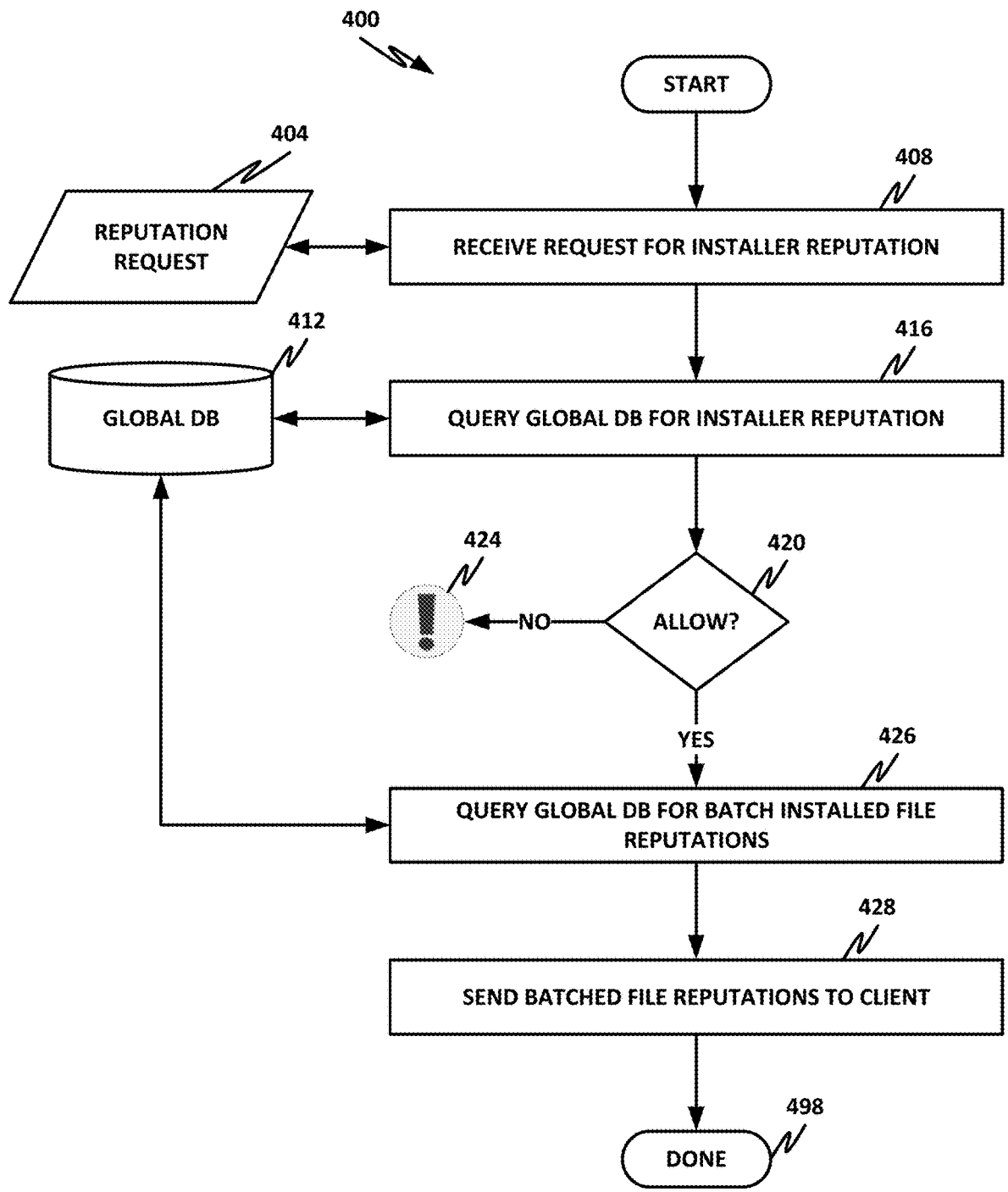
FIG. 4 is a block diagram of a method performed on a server to facilitate the method of FIG. 3.

FIG. 4 is a block diagram of a method 400 performed on a server to facilitate method 300 of FIG. 3. Method 400 may be performed, for example, by a server engine or other program on a security server that may be operated, by way of nonlimiting example, by security services provider 190 of FIG. 1.

In block 408, the server receives a reputation request 404 for an installer that is either predicted or known to be downloaded by the user. The reputation request could be for an individual file, or could be a reputation request for a website that the user is visiting, where the reputation may include a most likely file that the user is believed to have downloaded, or is anticipated or predicted to download from the website.

In block 416, the security server queries its global database 412 for an installer reputation.

In decision block 420, the server engine determines whether the installation should be allowed or not. If the installation should not be allowed, then in block 424, the server may return to the client an error or other warning message indicating that the file is not safe to install, and should not be installed.

If, however, in decision block 420 it is determined that the file is safe to install, then in block 426, the server engine may query its global database for file reputations for the individual files that are anticipated to be installed by the installer. The server engine may roll these individual reputations into a batch, and in block 428, may send the batched file reputations to the client. In block 498, the method is done.

Figure 5:
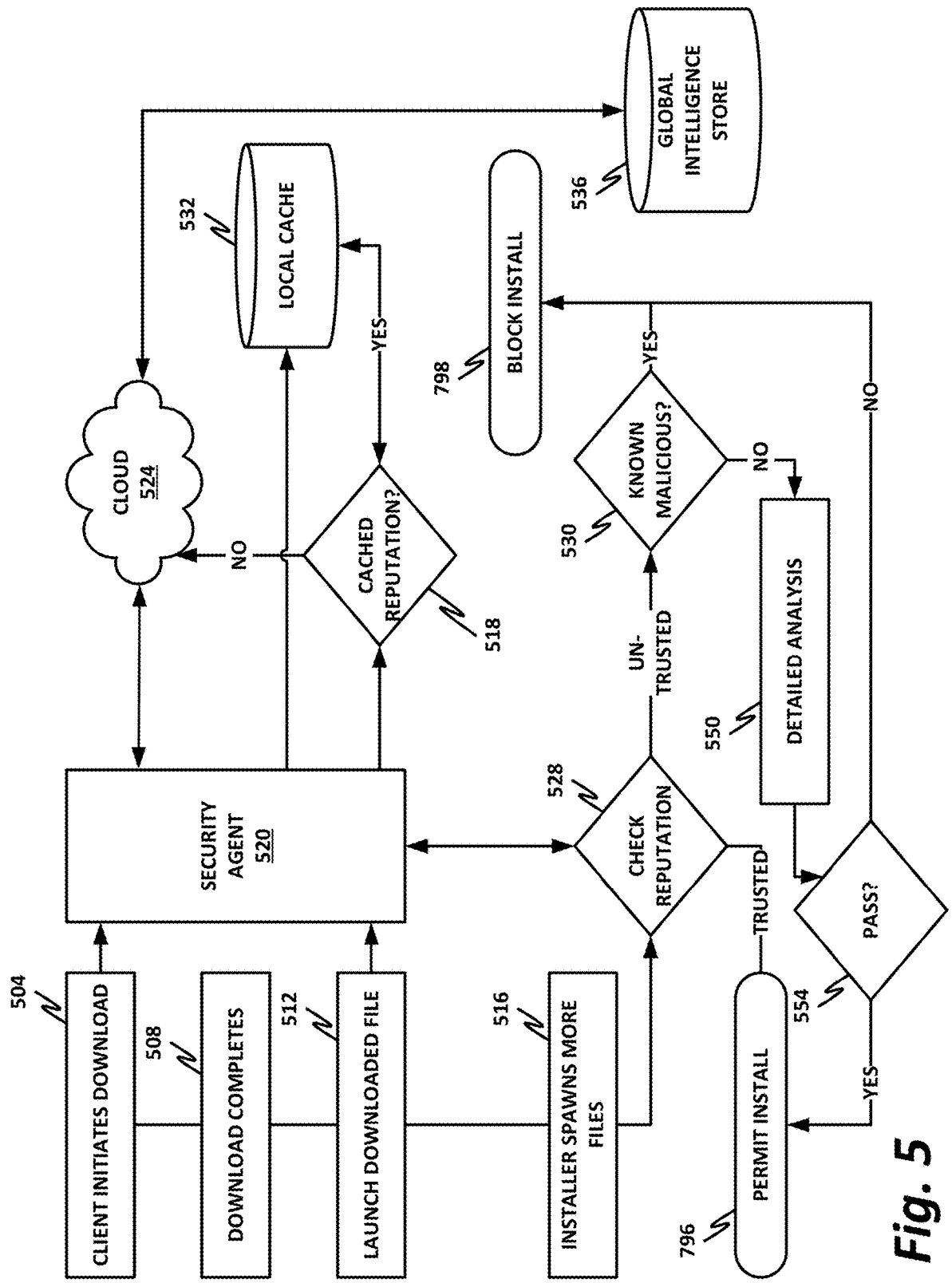
FIG. 5 is a block diagram illustrating a security architecture including integrated operations between a client device and a server device.

FIG. 5 is a block diagram illustrating a security architecture including integrated operations between a client device and a server device. In this FIGURE, there is no attempt to draw a bright-line distinction between server operations and client operations. This acknowledges the fact that, in various embodiments, the division between the various workloads may be performed differently. However, in context, a practitioner in the art should be able to appropriately design a client and/or server to perform the appropriate functions to realize a fully operational system.

In block 504, a client device initiates a download. This could occur, for example, because a user of the client device decides to download an executable installer file, or other executable or downloadable content. A security agent 520 may be configured to monitor activity, and determines that the download has occurred. Note that in some cases, the security agent 520 may also be configured to anticipate that a user may start a download before the download actually starts. Security agent 520 communicates with cloud 524 to query a global intelligence store 536 to receive a batch reputation for the downloaded file, along with other files associated with the downloaded file. This could include, for example, files that are anticipated to be installed by the downloaded file, or other files that are otherwise associated with the downloaded file that can be appropriately batched with the downloaded file. Global intelligence store 536 returns individual reputations for the files, and cloud 524 may then roll the reputations into a batch and provide the reputation batch to security agent 520. Note that when the client initiates the download in block 504, data may be provided by security agent 520 to cloud 524, such as the download location (URL), protocol, port number, or other identifying information about the file that may be useful in enabling cloud 524 to analyze the download and determine a reputation for the file.

Security agent 520, in performing a cloud lookup with cloud 524, may pass a variety of contextual information in addition to the identification of the file, itself. The contextual data could include, by way of nonlimiting example, the download location and protocol, the operating system (including platform, version, and language), the geographic location (including region and country), a referrer, and date or time. The security agent 520 could also provide application information, including the type (e.g., browser, script interpreter, system application, etcetera), name, version, and language.

In providing a reputation for the download, cloud 524 may compare the current query to other similar queries to return metadata to a pre-populated local system cache. The metadata may include the object hash and the correct trust score. Global intelligence store 536 may draw from intelligence gathered from other similar installations to determine the most likely file the server will return to the client to honor the download request using contextual information gathered by security agent 520. The relevant data may be sent back to the client, and the client may store the relevant data locally in a local cache 532 for later use.

In block 508, the download completes, and in block 512 a user or the system can launch the downloaded file.

In block 516, the installer may spawn additional files as part of its installation process. When new files are created, in decision block 528, a query is made to security agent 520 to determine a reputation for the individual file. Security agent 520 determines in block 518 whether there is a cached reputation for this file. If there is a cached reputation, then security agent 520 queries local cache 532 for the reputation. If there is no cached reputation, then security agent 520 queries cloud 524 for a reputation for the individual file. While on some level this may represent a failure of the prediction of which files should be included in the batch, if the number of files that need to be queried from cloud 524 remains relatively small, the advantages of the method are preserved. If the number of files that need to be queried from cloud 524 becomes very large, then analysis may be performed to revise the predictions, and to make better predictions in the future. This could include revising algorithms, or inspecting data sets to determine what is causing a large number of queries to cloud 524.

Returning to block 528, the reputation returned may be broadly classified into the categories of either "trusted" or "untrusted." If the file is trusted, then in block 796, the file is permitted to be installed. Note that this may occur a large number of times if a large number of files are created by the executable.

Returning to block 528, if the file is not trusted, then next a determination should be made whether the file is known already to be malicious. If the file is known to be malicious, then in block 798, the installation of that file is blocked. In some cases, this could cause failure of the entire installation, or it could simply cause blocking of the installation of that individual file. A notification could also be provided to cloud 524, which can update global intelligence store 536 to determine whether the installation of the known malicious file is an anomaly, or presents a corruption of the installer itself. This could also be an indication that the client device has been compromised, and may instigate other remedial action. Such action may include a security scan, or a notification to the user or a security administrator that the device may be compromised.

Returning to block 530, if the untrusted file is not known to be malicious, then it may be determined that the file has an unknown reputation. In this case, installation could be permitted, either with or without verification from the user or from a security administrator. But it may also be desirable to submit the file to additional detailed analysis in block 550. This detailed analysis could take the form, for example, of deep static analysis, testing in a sandbox environment, analysis by a human security researcher, analysis by fuzzy hashing or comparison to known malware objects, analysis by a deep learning model, or other antivirus or anti-malware methods that are known to detect malicious files with high accuracy. After the detailed analysis, in block 554, security agent 520 may determine whether the file has passed analysis. If the file has not passed analysis, then in block 798, the install may be blocked with all of the implications as discussed above. If the file does pass analysis, then in block 796, the install is permitted. In either the case of a block or a permission to install, data may be provided to cloud 524 to update and further refine models within global intelligence store 536 to provide better decisions in the future.

Figure 6:
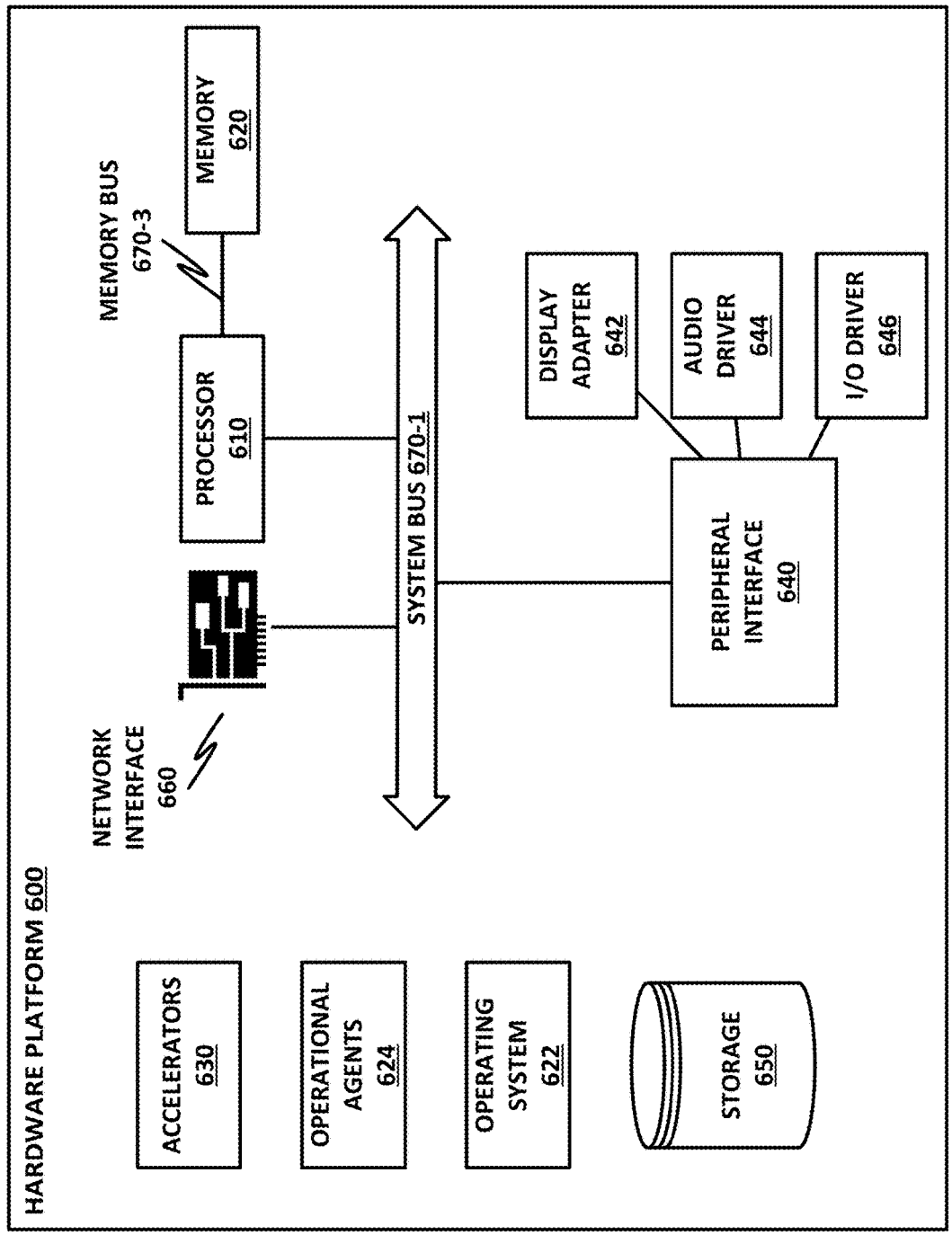
FIG. 6 is a block diagram of a hardware platform.

FIG. 6 is a block diagram of hardware platform 600. Embodiments of hardware platform 600 may be configured or adapted to provide the method of providing cached file reputations as disclosed in the present specification.

Hardware platform 600 may represent any suitable computing device. In various embodiments, a "computing device" may be or comprise, by way of nonlimiting example, a computer, workstation, server, mainframe, virtual machine (whether emulated or on a "bare-metal" hypervisor), network appliance, container, IoT device, embedded computer, embedded controller, embedded sensor, personal digital assistant, laptop computer, cellular telephone, Internet protocol (IP) telephone, smart phone, tablet computer, convertible tablet computer, computing appliance, receiver, wearable computer, handheld calculator, or any other electronic, microelectronic, or microelectromechanical device for processing and communicating data. Any computing device may be designated as a host on the network. Each computing device may refer to itself as a "local host," while any computing device external to it, including any device hosted on the same hardware but that is logically separated (e.g., a different virtual machine, container, or guest) may be designated as a "remote host."

In certain embodiments, client devices 110, home gateway 108, and the IoT devices illustrated in FIG. 1 may all be examples of devices that run on a hardware platform such as hardware platform 600. FIG. 6 presents a view of many possible elements that may be included in a hardware platform, but it should be understood that not all of these are necessary in every platform, and platforms may also include other elements. For example, peripheral interface 640 may be an essential component in a user-class device to provide input and output, while it may be completely unnecessary in a virtualized server or hardware appliance that communicates strictly via networking protocols.

By way of illustrative example, hardware platform 600 provides a processor 610 connected to a memory 620 and other system resources via one or more buses, such a system bus 670-1 and a memory bus 670-3.

Other components of hardware platform 600 include a storage 650, network interface 660, and peripheral interface 640. This architecture is provided by way of example only, and is intended to be nonexclusive and nonlimiting. Furthermore, the various parts disclosed are intended to be logical divisions only, and need not necessarily represent physically separate hardware and/or software components. Certain computing devices provide main memory 620 and storage 650, for example, in a single physical memory device, and in other cases, memory 620 and/or storage 650 are functionally distributed across many physical devices. In the case of virtual machines or hypervisors, all or part of a function may be provided in the form of software or firmware running over a virtualization layer to provide the disclosed logical function, and resources such as memory, storage, and accelerators may be disaggregated (i.e., located in different physical locations across a data center). In other examples, a device such as a network interface 660 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

In various examples, a "processor" may include any combination of logic elements operable to execute instructions, whether loaded from memory, or implemented directly in hardware, including, by way of nonlimiting example, a microprocessor, digital signal processor, field-programmable gate array, graphics processing unit, programmable logic array, application-specific integrated circuit, or virtual machine processor. In certain architectures, a multi-core processor may be provided, in which case processor 610 may be treated as only one core of a multi-core processor, or may be treated as the entire multi-core processor, as appropriate. In some embodiments, one or more co-processors may also be provided for specialized or support functions.

Processor 610 may be communicatively coupled to devices via a system bus 670-1. As used throughout this specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of nonlimiting example only, and that some embodiments may omit one or more of the foregoing buses, while others may employ additional or different buses. Common buses include peripheral component interconnect (PCI) and PCI express (PCIe), which are based on industry standards. However, system bus 670-1 is not so limited, and may include any other type of bus. Furthermore, as interconnects evolve, the distinction between a system bus and the network fabric is sometimes blurred. For example, if a node is disaggregated, access to some resources may be provided over the fabric, which may be or include, by way of nonlimiting example, Intel® Omni-Path™ Architecture (OPA), TrueScale™, Ultra Path Interconnect (UPI) (formerly called QPI or KTI), Fibre-Channel, Ethernet, FibreChannel over Ethernet (FCoE), InfiniBand, PCI, PCIe, or fiber optics, to name just a few.

In an example, processor 610 is communicatively coupled to memory 620 via memory bus 670-3, which may be, for example, a direct memory access (DMA) bus, though other memory architectures are possible, including ones in which memory 620 communicates with processor 610 via system bus 670-1 or some other bus. In the same or an alternate embodiment, memory bus 670-3 may include remote direct memory access (RDMA), wherein processor 610 accesses disaggregated memory resources via DMA or DMA-like interfaces.

To simplify this disclosure, memory 620 is disclosed as a single logical block, but in a physical embodiment may include one or more blocks of any suitable volatile or nonvolatile memory technology or technologies, including, for example, double data rate random-access memory (DDR RAM), static random-access memory (SRAM), dynamic random-access memory (DRAM), persistent random-access memory (PRAM), or other similar persistent fast memory, cache, Layer 1 (L1) or Layer 2 (L2) memory, on-chip memory, registers, flash, read-only memory (ROM), optical media, virtual memory regions, magnetic or tape memory, or similar. In certain embodiments, memory 620 may comprise a relatively low-latency volatile main memory, while storage 650 may comprise a relatively higher-latency nonvolatile memory. However, memory 620 and storage 650 need not be physically separate devices, and in some examples may represent simply a logical separation of function. It should also be noted that although DMA is disclosed by way of nonlimiting example, DMA is not the only protocol consistent with this specification, and that other memory architectures are available.

Storage 650 may be any species of memory 620, or may be a separate device. Storage 650 may include one or more non-transitory computer-readable mediums, including, by way of nonlimiting example, a hard drive, solid-state drive, external storage, microcode, hardware instructions, redundant array of independent disks (RAID), network attached storage, optical storage, tape drive, backup system, cloud storage, or any combination of the foregoing. Storage 650 may be, or may include therein, a database or databases or data stored in other configurations, and may include a stored copy of operational software such as operating system 622 and software portions, if any, of operational agents 624, accelerators 630, or other engines. Many other configurations are also possible, and are intended to be encompassed within the broad scope of this specification.

As necessary, hardware platform 600 may include an appropriate operating system, such as Microsoft Windows, Linux, Android, Mac OSX, Apple iOS, Unix, or similar. Some of the foregoing may be more often used on one type of device than another. For example, desktop computers or engineering workstations may be more likely to use one of Microsoft Windows, Linux, Unix, or Mac OSX. Laptop computers, which are usually a portable, off-the-shelf device with fewer customization options, may be more likely to run Microsoft Windows or Mac OSX. Mobile devices may be more likely to run Android or iOS. However, these examples are not intended to be limiting. Furthermore, hardware platform 600 may be configured for virtualization or containerization, in which case it may also provide a hypervisor, virtualization platform, virtual machine manager (VMM), orchestrator, containerization platform, or other infrastructure to provide flexibility in allocating resources.

Network interface 660 may be provided to communicatively couple hardware platform 600 to a wired or wireless network or fabric. A "network," as used throughout this specification, may include any communicative platform operable to exchange data or information within or between computing devices, including, by way of nonlimiting example, a local network, a switching fabric, an ad-hoc local network, an Internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Operational agents 624 are one or more computing engines that may include one or more non-transitory computer-readable mediums having stored thereon executable instructions operable to instruct a processor to provide operational functions. At an appropriate time, such as upon booting hardware platform 600 or upon a command from operating system 622 or a user or security administrator, processor 610 may retrieve a copy of operational agents 624 (or software portions thereof) from storage 650 and load it into memory 620. Processor 610 may then iteratively execute the instructions of operational agents 624 to provide the desired methods or functions.

As used throughout this specification, an "engine" includes any combination of one or more logic elements, of similar or dissimilar species, operable for and configured to perform one or more methods provided by the engine. In some cases, the engine may include a special integrated circuit designed to carry out a method or a part thereof, a field-programmable gate array (FPGA) programmed to provide a function, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware and software, including configuration files, registry entries, application programming interfaces (APIs), and interactive or user-mode software by way of nonlimiting example.

Peripheral interface 640 may be configured to interface with any auxiliary device that connects to hardware platform 600 but that is not necessarily a part of the core architecture of hardware platform 600. A peripheral may be operable to provide extended functionality to hardware platform 600, and may or may not be wholly dependent on hardware platform 600. In some cases, a peripheral may be a computing device in its own right. Peripherals may include input and output devices such as displays, terminals, printers, keyboards, mice, modems, data ports (e.g., serial, parallel, universal serial bus (USB), Firewire, or similar), network controllers, optical media, external storage, sensors, transducers, actuators, controllers, data acquisition buses, cameras, microphones, speakers, or external storage, by way of nonlimiting example.

In one example, peripherals include display adapter 642, audio driver 644, and input/output (I/O) driver 646. Display adapter 642 may be configured to provide a human-readable visual output, such as a command-line interface (CLI) or graphical desktop such as Microsoft Windows, Apple OSX desktop, or a Unix/Linux X Window System-based desktop. Display adapter 642 may provide output in any suitable format, such as a coaxial output, composite video, component video, video graphics array (VGA), or digital outputs such as digital visual interface (DVI) or high definition multimedia interface (HDMI), by way of nonlimiting example. In some examples, display adapter 642 may include a hardware graphics card, which may have its own memory and its own graphics processing unit (GPU). Audio driver 644 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth or Wi-Fi audio, by way of nonlimiting example.

Figure 7:
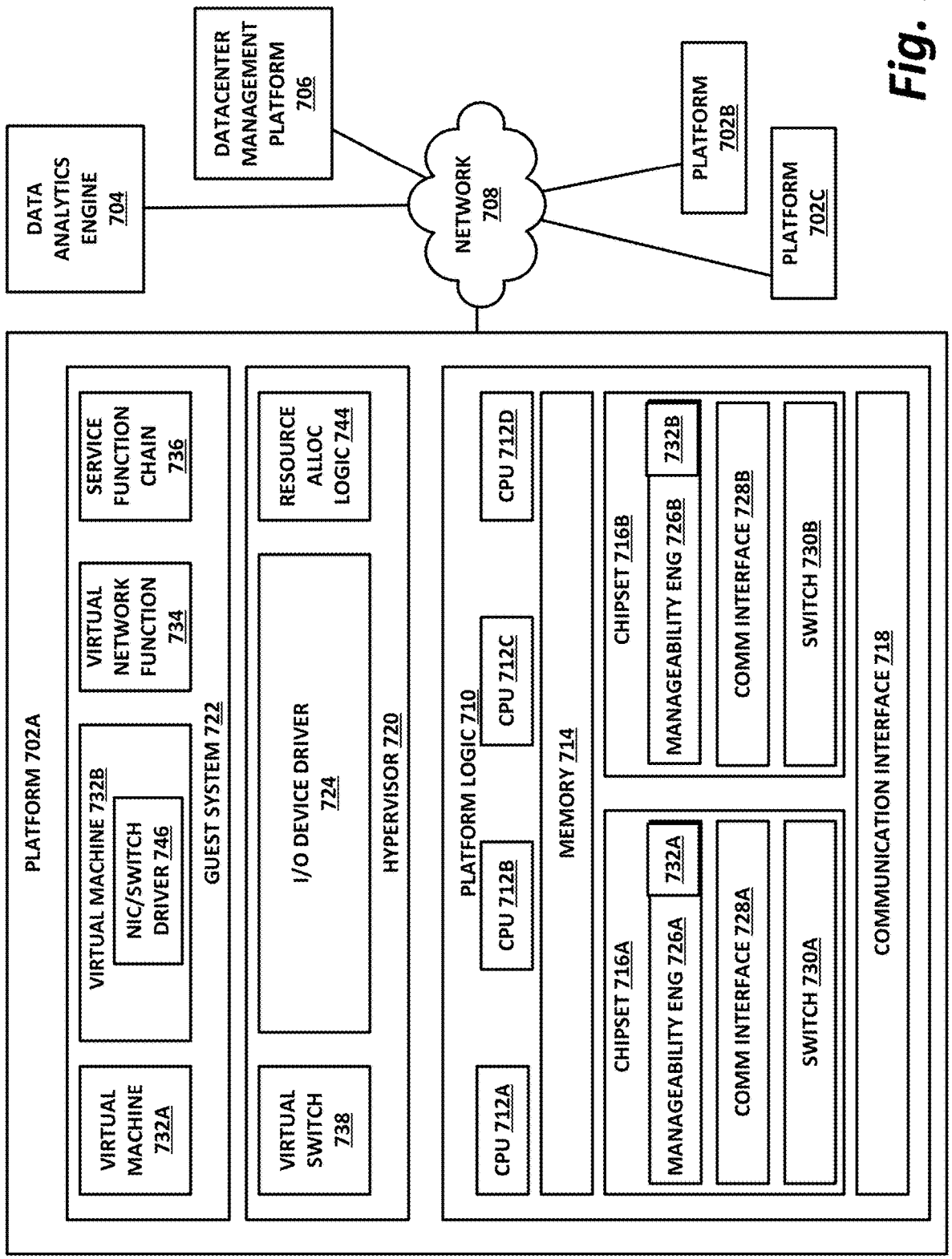
FIG. 7 is a block diagram of components of a computing platform.

FIG. 7 is a block diagram of components of a computing platform 702A. Embodiments of computing platform 702A may be configured or adapted to provide the method of providing cached file reputations as disclosed in the present specification.

In the embodiment depicted, platforms 702A, 702B, and 702C, along with a data center management platform 706 and data analytics engine 704 are interconnected via network 708. In other embodiments, a computer system may include any suitable number (i.e., one or more) of platforms. In some embodiments (e.g., when a computer system only includes a single platform), all or a portion of the system management platform 706 may be included on a platform 702. A platform 702 may include platform logic 710 with one or more central processing units (CPUs) 712, memories 714 (which may include any number of different modules), chipsets 716, communication interfaces 718, and any other suitable hardware and/or software to execute a hypervisor 720 or other operating system capable of executing workloads associated with applications running on platform 702. In some embodiments, a platform 702 may function as a host platform for one or more guest systems 722 that invoke these applications. Platform 702A may represent any suitable computing environment, such as a high performance computing environment, a data center, a communications service provider infrastructure (e.g., one or more portions of an Evolved Packet Core), an in-memory computing environment, a computing system of a vehicle (e.g., an automobile or airplane), an Internet of things environment, an industrial control system, other computing environment, or combination thereof.

In various embodiments of the present disclosure, accumulated stress and/or rates of stress accumulated of a plurality of hardware resources (e.g., cores and uncores) are monitored and entities (e.g., system management platform 706, hypervisor 720, or other operating system) of computer platform 702A may assign hardware resources of platform logic 710 to perform workloads in accordance with the stress information. In some embodiments, self-diagnostic capabilities may be combined with the stress monitoring to more accurately determine the health of the hardware resources. Each platform 702 may include platform logic 710. Platform logic 710 comprises, among other logic enabling the functionality of platform 702, one or more CPUs 712, memory 714, one or more chipsets 716, and communication interfaces 728. Although three platforms are illustrated, computer platform 702A may be interconnected with any suitable number of platforms. In various embodiments, a platform 702 may reside on a circuit board that is installed in a chassis, rack, or other suitable structure that comprises multiple platforms coupled together through network 708 (which may comprise, e.g., a rack or backplane switch).

CPUs 712 may each comprise any suitable number of processor cores and supporting logic (e.g., uncores). The cores may be coupled to each other, to memory 714, to at least one chipset 716, and/or to a communication interface 718, through one or more controllers residing on CPU 712 and/or chipset 716. In particular embodiments, a CPU 712 is embodied within a socket that is permanently or removably coupled to platform 702A. Although four CPUs are shown, a platform 702 may include any suitable number of CPUs.

Memory 714 may comprise any form of volatile or nonvolatile memory including, without limitation, magnetic media (e.g., one or more tape drives), optical media, RAM, ROM, flash memory, removable media, or any other suitable local or remote memory component or components. Memory 714 may be used for short, medium, and/or long term storage by platform 702A. Memory 714 may store any suitable data or information utilized by platform logic 710, including software embedded in a computer-readable medium, and/or encoded logic incorporated in hardware or otherwise stored (e.g., firmware). Memory 714 may store data that is used by cores of CPUs 712. In some embodiments, memory 714 may also comprise storage for instructions that may be executed by the cores of CPUs 712 or other processing elements (e.g., logic resident on chipsets 716) to provide functionality associated with the manageability engine 726 or other components of platform logic 710. A platform 702 may also include one or more chipsets 716 comprising any suitable logic to support the operation of the CPUs 712. In various embodiments, chipset 716 may reside on the same die or package as a CPU 712 or on one or more different dies or packages. Each chipset may support any suitable number of CPUs 712. A chipset 716 may also include one or more controllers to couple other components of platform logic 710 (e.g., communication interface 718 or memory 714) to one or more CPUs. In the embodiment depicted, each chipset 716 also includes a manageability engine 726. Manageability engine 726 may include any suitable logic to support the operation of chipset 716. In a particular embodiment, a manageability engine 726 (which may also be referred to as an innovation engine) is capable of collecting real-time telemetry data from the chipset 716, the CPU(s) 712 and/or memory 714 managed by the chipset 716, other components of platform logic 710, and/or various connections between components of platform logic 710. In various embodiments, the telemetry data collected includes the stress information described herein.

In various embodiments, a manageability engine 726 operates as an out-of-band asynchronous compute agent which is capable of interfacing with the various elements of platform logic 710 to collect telemetry data with no or minimal disruption to running processes on CPUs 712. For example, manageability engine 726 may comprise a dedicated processing element (e.g., a processor, controller, or other logic) on chipset 716, which provides the functionality of manageability engine 726 (e.g., by executing software instructions), thus conserving processing cycles of CPUs 712 for operations associated with the workloads performed by the platform logic 710. Moreover, the dedicated logic for the manageability engine 726 may operate asynchronously with respect to the CPUs 712 and may gather at least some of the telemetry data without increasing the load on the CPUs.

A manageability engine 726 may process telemetry data it collects (specific examples of the processing of stress information will be provided herein). In various embodiments, manageability engine 726 reports the data it collects and/or the results of its processing to other elements in the computer system, such as one or more hypervisors 720 or other operating systems and/or system management software (which may run on any suitable logic such as system management platform 706). In particular embodiments, a critical event such as a core that has accumulated an excessive amount of stress may be reported prior to the normal interval for reporting telemetry data (e.g., a notification may be sent immediately upon detection).

Additionally, manageability engine 726 may include programmable code configurable to set which CPU(s) 712 a particular chipset 716 will manage and/or which telemetry data will be collected.

Chipsets 716 also each include a communication interface 728. Communication interface 728 may be used for the communication of signaling and/or data between chipset 716 and one or more I/O devices, one or more networks 708, and/or one or more devices coupled to network 708 (e.g., system management platform 706). For example, communication interface 728 may be used to send and receive network traffic such as data packets. In a particular embodiment, a communication interface 728 comprises one or more physical network interface controllers (NICs), also known as network interface cards or network adapters. A NIC may include electronic circuitry to communicate using any suitable physical layer and data link layer standard such as Ethernet (e.g., as defined by a IEEE 802.3 standard), Fibre Channel, InfiniBand, Wi-Fi, or other suitable standard. A NIC may include one or more physical ports that may couple to a cable (e.g., an Ethernet cable). A NIC may enable communication between any suitable element of chipset 716 (e.g., manageability engine 726 or switch 730) and another device coupled to network 708. In various embodiments a NIC may be integrated with the chipset (i.e., may be on the same integrated circuit or circuit board as the rest of the chipset logic) or may be on a different integrated circuit or circuit board that is electromechanically coupled to the chipset.

In particular embodiments, communication interfaces 728 may allow communication of data (e.g., between the manageability engine 726 and the data center management platform 706) associated with management and monitoring functions performed by manageability engine 726. In various embodiments, manageability engine 726 may utilize elements (e.g., one or more NICs) of communication interfaces 728 to report the telemetry data (e.g., to system management platform 706) in order to reserve usage of NICs of communication interface 718 for operations associated with workloads performed by platform logic 710.

Switches 730 may couple to various ports (e.g., provided by NICs) of communication interface 728 and may switch data between these ports and various components of chipset 716 (e.g., one or more Peripheral Component Interconnect Express (PCIe) lanes coupled to CPUs 712). Switches 730 may be a physical or virtual (i.e., software) switch.

Platform logic 710 may include an additional communication interface 718. Similar to communication interfaces 728, communication interfaces 718 may be used for the communication of signaling and/or data between platform logic 710 and one or more networks 708 and one or more devices coupled to the network 708. For example, communication interface 718 may be used to send and receive network traffic such as data packets. In a particular embodiment, communication interfaces 718 comprise one or more physical NICs. These NICs may enable communication between any suitable element of platform logic 710 (e.g., CPUs 712 or memory 714) and another device coupled to network 708 (e.g., elements of other platforms or remote computing devices coupled to network 708 through one or more networks).

Platform logic 710 may receive and perform any suitable types of workloads. A workload may include any request to utilize one or more resources of platform logic 710, such as one or more cores or associated logic. For example, a workload may comprise a request to instantiate a software component, such as an I/O device driver 724 or guest system 722; a request to process a network packet received from a virtual machine 732 or device external to platform 702A (such as a network node coupled to network 708); a request to execute a process or thread associated with a guest system 722, an application running on platform 702A, a hypervisor 720 or other operating system running on platform 702A; or other suitable processing request.

A virtual machine 732 may emulate a computer system with its own dedicated hardware. A virtual machine 732 may run a guest operating system on top of the hypervisor 720. The components of platform logic 710 (e.g., CPUs 712, memory 714, chipset 716, and communication interface 718) may be virtualized such that it appears to the guest operating system that the virtual machine 732 has its own dedicated components.

A virtual machine 732 may include a virtualized NIC (vNIC), which is used by the virtual machine as its network interface. A vNIC may be assigned a media access control (MAC) address or other identifier, thus allowing multiple virtual machines 732 to be individually addressable in a network.

VNF 734 may comprise a software implementation of a functional building block with defined interfaces and behavior that can be deployed in a virtualized infrastructure. In particular embodiments, a VNF 734 may include one or more virtual machines 732 that collectively provide specific functionalities (e.g., WAN optimization, VPN termination, firewall operations, load-balancing operations, security functions, etc.). A VNF 734 running on platform logic 710 may provide the same functionality as traditional network components implemented through dedicated hardware. For example, a VNF 734 may include components to perform any suitable NFV workloads, such as virtualized evolved packet core (vEPC) components, mobility management entities (MMEs), 3rd Generation Partnership Project (3GPP) control and data plane components, etc.

SFC 736 is a group of VNFs 734 organized as a chain to perform a series of operations, such as network packet processing operations. Service function chaining may provide the ability to define an ordered list of network services (e.g., firewalls and load balancers) that are stitched together in the network to create a service chain.

A hypervisor 720 (also known as a virtual machine monitor) may comprise logic to create and run guest systems 722. The hypervisor 720 may present guest operating systems run by virtual machines with a virtual operating platform (i.e., it appears to the virtual machines that they are running on separate physical nodes when they are actually consolidated onto a single hardware platform) and manage the execution of the guest operating systems by platform logic 710. Services of hypervisor 720 may be provided by virtualizing in software or through hardware assisted resources that require minimal software intervention, or both. Multiple instances of a variety of guest operating systems may be managed by the hypervisor 720. Each platform 702 may have a separate instantiation of a hypervisor 720.

Hypervisor 720 may be a native or bare-metal hypervisor that runs directly on platform logic 710 to control the platform logic and manage the guest operating systems. Alternatively, hypervisor 720 may be a hosted hypervisor that runs on a host operating system and abstracts the guest operating systems from the host operating system. Hypervisor 720 may include a virtual switch 738 that may provide virtual switching and/or routing functions to virtual machines of guest systems 722. The virtual switch 738 may comprise a logical switching fabric that couples the vNICs of the virtual machines 732 to each other, thus creating a virtual network through which virtual machines may communicate with each other.

Virtual switch 738 may comprise a software element that is executed using components of platform logic 710. In various embodiments, hypervisor 720 may be in communication with any suitable entity (e.g., a SDN controller) which may cause hypervisor 720 to reconfigure the parameters of virtual switch 738 in response to changing conditions in platform 702 (e.g., the addition or deletion of virtual machines 732 or identification of optimizations that may be made to enhance performance of the platform).

Hypervisor 720 may also include resource allocation logic 744, which may include logic for determining allocation of platform resources based on the telemetry data (which may include stress information). Resource allocation logic 744 may also include logic for communicating with various components of platform logic 710 entities of platform 702A to implement such optimization, such as components of platform logic 710.

Any suitable logic may make one or more of these optimization decisions. For example, system management platform 706; resource allocation logic 744 of hypervisor 720 or other operating system; or other logic of computer platform 702A may be capable of making such decisions. In various embodiments, the system management platform 706 may receive telemetry data from and manage workload placement across multiple platforms 702. The system management platform 706 may communicate with hypervisors 720 (e.g., in an out-of-band manner) or other operating systems of the various platforms 702 to implement workload placements directed by the system management platform.

The elements of platform logic 710 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g., cache coherent) bus, a layered protocol architecture, a differential bus, or a Gunning transceiver logic (GTL) bus.

Elements of the computer platform 702A may be coupled together in any suitable manner such as through one or more networks 708. A network 708 may be any suitable network or combination of one or more networks operating using one or more suitable networking protocols. A network may represent a series of nodes, points, and interconnected communication paths for receiving and transmitting packets of information that propagate through a communication system. For example, a network may include one or more firewalls, routers, switches, security appliances, antivirus servers, or other useful network devices.

Figure 8:
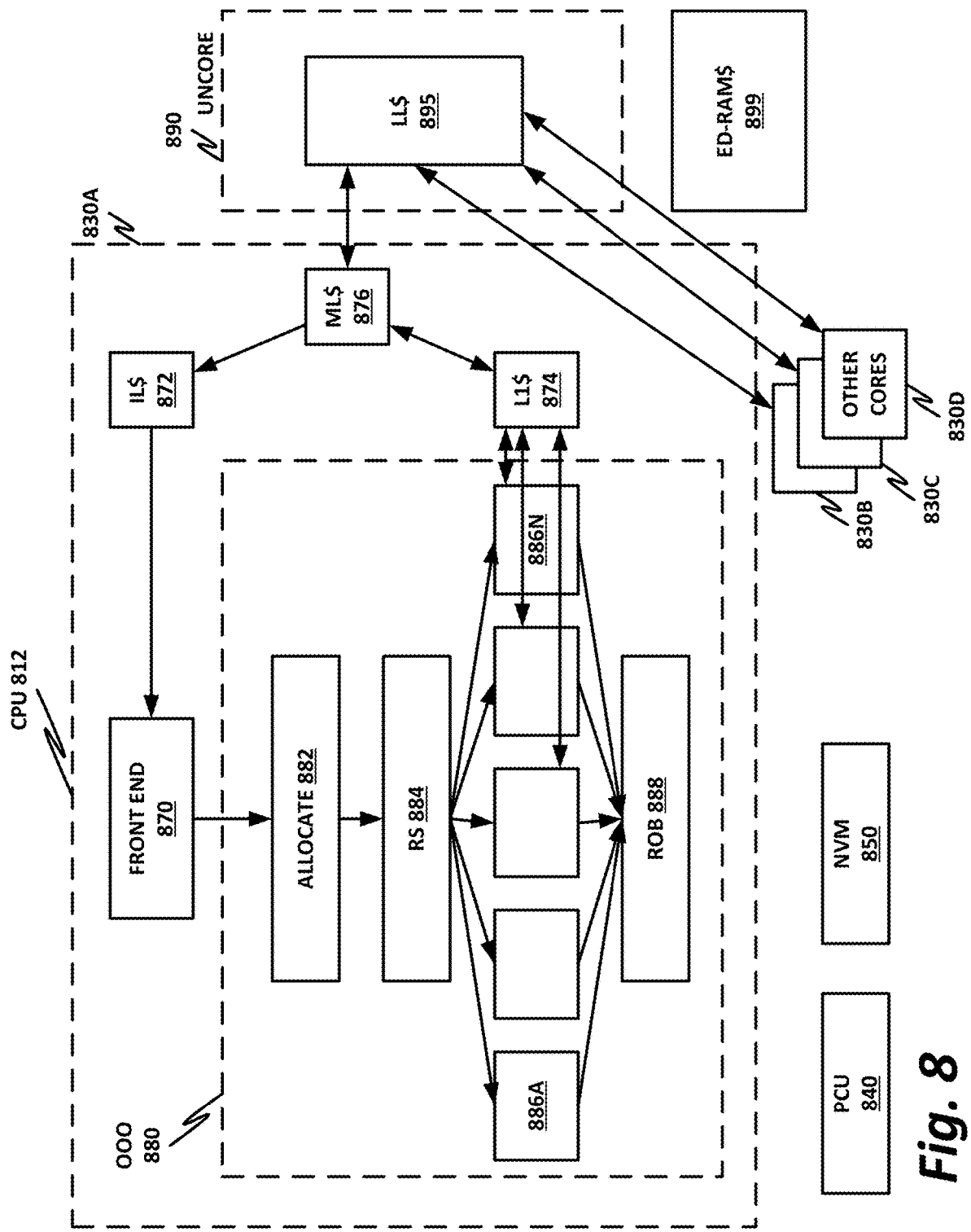
FIG. 8 is a block diagram of a central processing unit (CPU).

FIG. 8 illustrates a block diagram of a central processing unit (CPU) 812. Embodiments of CPU 812 may be configured or adapted to provide the method of providing cached file reputations as disclosed in the present specification.

Although CPU 812 depicts a particular configuration, the cores and other components of CPU 812 may be arranged in any suitable manner. CPU 812 may comprise any processor or processing device, such as a microprocessor, an embedded processor, a digital signal processor (DSP), a network processor, an application processor, a co-processor, a system-on-a-chip (SoC), or other device to execute code. CPU 812, in the depicted embodiment, includes four processing elements (cores 830 in the depicted embodiment), which may include asymmetric processing elements or symmetric processing elements. However, CPU 812 may include any number of processing elements that may be symmetric or asymmetric.

Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. A physical CPU may include any suitable number of cores. In various embodiments, cores may include one or more out-of-order processor cores or one or more in-order processor cores. However, cores may be individually selected from any type of core, such as a native core, a software managed core, a core adapted to execute a native instruction set architecture (ISA), a core adapted to execute a translated ISA, a co-designed core, or other known core. In a heterogeneous core environment (i.e. asymmetric cores), some form of translation, such as binary translation, may be utilized to schedule or execute code on one or both cores.

In the embodiment depicted, core 830A includes an out-of-order processor that has a front end unit 870 used to fetch incoming instructions, perform various processing (e.g., caching, decoding, branch predicting, etc.) and passing instructions/operations along to an out-of-order (OOO) engine. The OOO engine performs further processing on decoded instructions.

A front end 870 may include a decode module coupled to fetch logic to decode fetched elements. Fetch logic, in one embodiment, includes individual sequencers associated with thread slots of cores 830. Usually, a core 830 is associated with a first ISA, which defines/specifies instructions executable on core 830. Often, machine code instructions that are part of the first ISA include a portion of the instruction (referred to as an opcode), which references/specifies an instruction or operation to be performed. The decode module may include circuitry that recognizes these instructions from their opcodes and passes the decoded instructions on in the pipeline for processing as defined by the first ISA. Decoders of cores 830, in one embodiment, recognize the same ISA (or a subset thereof). Alternatively, in a heterogeneous core environment, a decoder of one or more cores (e.g., core 830B) may recognize a second ISA (either a subset of the first ISA or a distinct ISA).

In the embodiment depicted, the OOO engine includes an allocate unit 882 to receive decoded instructions, which may be in the form of one or more micro-instructions or uops, from front end unit 870, and allocate them to appropriate resources such as registers and so forth. Next, the instructions are provided to a reservation station 884, which reserves resources and schedules them for execution on one of a plurality of execution units 886A-886N. Various types of execution units may be present, including, for example, arithmetic logic units (ALUs), load and store units, vector processing units (VPUs), and floating point execution units, among others. Results from these different execution units are provided to a reorder buffer (ROB) 888, which take unordered results and return them to correct program order.

In the embodiment depicted, both front end unit 870 and OOO engine 880 are coupled to different levels of a memory hierarchy. Specifically shown is an instruction level cache 872, that in turn couples to a mid-level cache 876, that in turn couples to a last level cache 895. In one embodiment, last level cache 895 is implemented in an on-chip (sometimes referred to as uncore) unit 890. Uncore 890 may communicate with system memory 899, which, in the illustrated embodiment, is implemented via embedded DRAM (eDRAM). The various execution units 886 within OOO engine 880 are in communication with a first level cache 874 that also is in communication with mid-level cache 876. Additional cores 830B-830D may couple to last level cache 895 as well.

In particular embodiments, uncore 890 may be in a voltage domain and/or a frequency domain that is separate from voltage domains and/or frequency domains of the cores. That is, uncore 890 may be powered by a supply voltage that is different from the supply voltages used to power the cores and/or may operate at a frequency that is different from the operating frequencies of the cores.

CPU 812 may also include a power control unit (PCU) 840. In various embodiments, PCU 840 may control the supply voltages and the operating frequencies applied to each of the cores (on a per-core basis) and to the uncore. PCU 840 may also instruct a core or uncore to enter an idle state (where no voltage and clock are supplied) when not performing a workload.

In various embodiments, PCU 840 may detect one or more stress characteristics of a hardware resource, such as the cores and the uncore. A stress characteristic may comprise an indication of an amount of stress that is being placed on the hardware resource. As examples, a stress characteristic may be a voltage or frequency applied to the hardware resource; a power level, current level, or voltage level sensed at the hardware resource; a temperature sensed at the hardware resource; or other suitable measurement. In various embodiments, multiple measurements (e.g., at different locations) of a particular stress characteristic may be performed when sensing the stress characteristic at a particular instance of time. In various embodiments, PCU 840 may detect stress characteristics at any suitable interval.

In various embodiments, PCU 840 is a component that is discrete from the cores 830. In particular embodiments, PCU 840 runs at a clock frequency that is different from the clock frequencies used by cores 830. In some embodiments where the PCU is a microcontroller, PCU 840 executes instructions according to an ISA that is different from an ISA used by cores 830.

In various embodiments, CPU 812 may also include a nonvolatile memory 850 to store stress information (such as stress characteristics, incremental stress values, accumulated stress values, stress accumulation rates, or other stress information) associated with cores 830 or uncore 890, such that when power is lost, the stress information is maintained.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in an SoC, including a CPU package. An SoC represents an integrated circuit (IC) that integrates components of a computer or other electronic system into a single chip. Thus, for example, client devices 110 or server devices may be provided, in whole or in part, in an SoC. The SoC may contain digital, analog, mixed-signal, and radio frequency functions, all of which may be provided on a single chip substrate. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAs, and other semiconductor chips.

Note also that in certain embodiments, some of the components may be omitted or consolidated. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor, such as processor 610, can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, an FPGA, an erasable programmable read-only memory (EPROM), an electrically erasable programmable read-only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage such as storage 650 may store information in any suitable type of tangible, non-transitory storage medium (for example, RAM, ROM, FPGA, EPROM, electrically erasable programmable ROM (EEPROM), etc.), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, such as memory 620 and storage 650, should be construed as being encompassed within the broad terms 'memory' and 'storage,' as appropriate. A non-transitory storage medium herein is expressly intended to include any non-transitory, special-purpose or programmable hardware configured to provide the disclosed operations, or to cause a processor such as processor 610 to perform the disclosed operations.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application-specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated or sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

EXAMPLE IMPLEMENTATIONS

There is disclosed in one example, a computing apparatus, comprising: a network interface; a hardware platform, comprising at least a processor and a memory; and instructions encoded in the memory to instruct the processor to: identify an installer object to be run on the apparatus, the installer object to provision a plurality of local files or objects with unknown local reputations; query via the network interface a remote service with an identification of the installer object; responsive to the query, receive from the remote service a reputation batch for the local files or object; and selectively permit installation of the installer object and/or the plurality of local files or objects based at least in part on individual reputations within the reputation batch.

There is further disclosed an example computing apparatus, wherein the installer object is a downloaded or downloadable Internet file.

There is further disclosed an example computing apparatus, wherein the instructions are further to analyze a visited Internet site to determine whether it contains a downloadable file.

There is further disclosed an example computing apparatus, wherein the instructions are further to determine that the visited Internet site contains a downloadable file, and to determine a most likely download target.

There is further disclosed an example computing apparatus, wherein determining a most likely download target comprises selecting from a plurality of download targets based on an operating system and/or processor word size.

There is further disclosed an example computing apparatus, wherein the instructions are further to determine that the visited Internet site contains no downloadable file, and that there is no likely download target.

There is further disclosed an example computing apparatus, wherein the instructions are to query the remote service for the most likely download target.

There is further disclosed an example computing apparatus, wherein the instructions are further to identify a file or object not in the reputation batch, and to query the remote service for the file or object not in the reputation batch.

There is further disclosed an example computing apparatus, wherein the installer object is an installer.

There is further disclosed an example computing apparatus, wherein the installer object is an installation script.

There is further disclosed an example computing apparatus, wherein the installer object is an installation archive.

There is further disclosed an example computing apparatus, wherein the remote service is a cloud service.

There is further disclosed an example computing apparatus, wherein the remote service is a global threat intelligence store.

There is further disclosed an example computing apparatus, wherein the remote service is an enterprise threat intelligence store.

There is also disclosed an example of one or more tangible, non-transitory computer-readable storage mediums having stored thereon executable instructions to: receive an executable object; query a network-based security service with an identification of the executable object; receive from the network-based security service an object reputation bundle, the object reputation bundle comprising a reputation for the executable object and for a plurality of child objects predicted to be created or fetched by the executable object; cache the object reputation bundle locally; and after receiving a directive to run the executable object, permit installation of the executable object and the child objects only if the objects have sufficiently positive reputation in the cache.

There is further disclosed an example of one or more tangible, non-transitory computer-readable mediums, wherein the executable instructions are further to analyze a visited web site to determine whether it contains a downloadable file.

There is further disclosed an example of one or more tangible, non-transitory computer-readable mediums, wherein the executable instructions are further to determine that the visited web site contains a downloadable file, and to determine a most likely download target.

There is further disclosed an example of one or more tangible, non-transitory computer-readable mediums, wherein the executable object is an installer script or installation archive.

There is further disclosed an example of one or more tangible, non-transitory computer-readable mediums, wherein the executable instructions are further to determine that the visited web site contains no downloadable file, and that there is no likely download target.

There is further disclosed an example of one or more tangible, non-transitory computer-readable mediums, wherein the executable instructions are to query the remote service for the most likely download target.

There is further disclosed an example of one or more tangible, non-transitory computer-readable mediums, wherein the executable instructions are further to identify a child object not locally cached in the reputation bundle, and to query the network-based security service for the file or object not in the reputation batch.

There is further disclosed an example of one or more tangible, non-transitory computer-readable mediums, wherein the executable object is an installation script.

There is further disclosed an example of one or more tangible, non-transitory computer-readable mediums, wherein the remote service is a cloud service.

There is further disclosed an example of one or more tangible, non-transitory computer-readable mediums, wherein the remote service is a global threat intelligence store.

There is further disclosed an example of one or more tangible, non-transitory computer-readable mediums, wherein the remote service is an enterprise threat intelligence store.

There is also disclosed an example computer-implemented method of providing device security, comprising: identifying a first executable object; querying a network-based security service with an identification of the first executable object; receiving from the network-based security service a reputation bundle, the reputation bundle comprising reputations of a plurality of second objects predicted to be associated with the first object; writing the reputation bundle to a local cache; executing the first executable object to create a plurality of child objects; and selectively permitting installation of a child object comprising inspecting the local cache to identify a cached reputation for the child object.

There is further disclosed an example computer-implemented method, wherein the first executable object is an installer.

There is further disclosed an example computer-implemented method, further comprising analyzing a visited web site to determine whether it contains a downloadable file.

There is further disclosed an example computer-implemented method, further comprising determining that the visited web site contains a downloadable file, and to determine a most likely download target.

There is further disclosed an example computer-implemented method, wherein determining a most likely download target comprises selecting from a plurality of download targets based on an operating system and/or processor word size.

There is further disclosed an example computer-implemented method, further comprising determining that the visited web site contains no downloadable file, and that there is no likely download target.

There is further disclosed an example computer-implemented method, further comprising querying the network-based security service for the most likely download target.

There is further disclosed an example computer-implemented method, further comprising identifying a child object not locally cached in the reputation bundle, and to query the network-based security service for the file or object not in the reputation batch.

There is further disclosed an example computer-implemented method, wherein the executable object is an installation script.

There is further disclosed an example computer-implemented method, wherein the network-based security service is a cloud service.

There is further disclosed an example computer-implemented method, wherein the network-based security service comprises a global threat intelligence store.

There is further disclosed an example computer-implemented method, wherein the network-based security service comprises an enterprise threat intelligence store.

What is claimed is:

1. A computing apparatus, comprising:
   a network interface;
   a hardware platform, comprising at least a processor and a memory; and
   instructions encoded in the memory to instruct the processor to:
   identify an installer object to be run on the computing apparatus, the installer object to provision a plurality of local files or objects with unknown local reputations;
   query via the network interface a remote service with an identification of the installer object;
   responsive to the query, receive from the remote service a reputation batch for the local files or object;
   identify a file or object not in the reputation batch and query the remote service for the file or object not in the reputation batch; and
   selectively permit installation of the installer object and/or the plurality of local files or objects based at least in part on individual reputations within the reputation batch.

2. The computing apparatus of claim 1, wherein the installer object is a downloaded or downloadable Internet file.

3. The computing apparatus of claim 2, wherein the instructions are further to analyze a visited Internet site to determine whether it contains a downloadable file.

4. The computing apparatus of claim 3, wherein the instructions are further to determine that the visited Internet site contains a downloadable file, and to determine a most likely download target.

5. The computing apparatus of claim 4, wherein determining a most likely download target comprises selecting from a plurality of download targets based on an operating system and/or processor word size.

6. The computing apparatus of claim 3, wherein the instructions are further to determine that the visited Internet site contains no downloadable file, and that there is no likely download target.

7. The computing apparatus of claim 3, wherein the instructions are to query the remote service for a most likely download target.

8. The computing apparatus of claim 1, wherein the installer object is an installation script.

9. The computing apparatus of claim 1, wherein the installer object is an installation archive.

10. The computing apparatus of claim 1, wherein the remote service is a cloud service.

11. The computing apparatus of claim 1, wherein the remote service is a global threat intelligence store.

12. The computing apparatus of claim 1, wherein the remote service is an enterprise threat intelligence store.

13. One or more tangible, non-transitory computer-readable storage mediums having stored thereon executable instructions to:
   receive an executable object;
   query a network-based security service with an identification of the executable object;
   receive from the network-based security service an object reputation bundle, the object reputation bundle comprising a reputation for the executable object and for a plurality of child objects predicted to be created or fetched by the executable object;
   cache the object reputation bundle locally; and
   after receiving a directive to run the executable object, permit installation of the executable object and the child objects only if the executable objects have sufficiently positive reputation in the cache.

14. The one or more tangible, non-transitory computer-readable mediums of claim 13, wherein the executable instructions are further to analyze a visited Internet location to determine whether it contains a downloadable file.

15. The one or more tangible, non-transitory computer-readable mediums of claim 14, wherein the executable instructions are further to determine that the visited Internet location contains a downloadable file, and to determine a most likely download target.

16. The one or more tangible, non-transitory computer-readable mediums of claim 13, wherein the executable object is an installer script or installation archive.

17. A computer-implemented method of providing device security, comprising:
   identifying a first executable object;
   querying a network-based security service with an identification of the first executable object;
   receiving from the network-based security service a reputation bundle, the reputation bundle comprising reputations of a plurality of second objects predicted to be associated with the first executable object;
   writing the reputation bundle to a local cache;
   executing the first executable object to create a plurality of child objects; and
   selectively permitting installation of a child object comprising inspecting the local cache to identify a cached reputation for the child object.

18. The method of claim 17, wherein the first executable object is an installer.

19. The method of claim 18, further comprising analyzing a visited web site to determine whether it contains a downloadable file.

* * * * *